US010101909B2

(12) United States Patent
Song

(10) Patent No.: US 10,101,909 B2
(45) Date of Patent: Oct. 16, 2018

(54) MEMORY SYSTEM AND OPERATING METHOD FOR PROGRAMMING DATA IN SUPER BLOCKS

(71) Applicant: SK hynix Inc., Gyeonggi-do (KR)

(72) Inventor: Min-O Song, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 229 days.

(21) Appl. No.: 14/827,133

(22) Filed: Aug. 14, 2015

(65) Prior Publication Data

US 2016/0274791 A1 Sep. 22, 2016

(30) Foreign Application Priority Data

Mar. 18, 2015 (KR) ........................ 10-2015-0037268

(51) Int. Cl.
*G06F 12/02* (2006.01)
*G06F 3/06* (2006.01)

(52) U.S. Cl.
CPC ............ *G06F 3/0604* (2013.01); *G06F 3/064* (2013.01); *G06F 3/0679* (2013.01); *G06F 3/0688* (2013.01); *G06F 12/0246* (2013.01); *G06F 2212/7202* (2013.01)

(58) Field of Classification Search
CPC .. G06F 3/0604; G06F 3/0688; G06F 12/0246; G06F 3/0679; G06F 3/064; G06F 2212/7202
See application file for complete search history.

(56) References Cited

U.S. PATENT DOCUMENTS

| | | | |
|---|---|---|---|
| 8,209,474 B1* | 6/2012 | Weiler | G06F 12/0246 365/185.33 |
| 9,704,583 B2* | 7/2017 | Song | G11C 16/0483 |
| 2005/0144357 A1* | 6/2005 | Sinclair | G06F 12/0246 711/103 |
| 2009/0080247 A1* | 3/2009 | Lasser | G11C 11/5628 365/185.03 |
| 2010/0169544 A1 | 7/2010 | Eom et al. | |
| 2011/0029749 A1 | 2/2011 | Yang et al. | |
| 2011/0283052 A1 | 11/2011 | Mukaida | |
| 2012/0059976 A1* | 3/2012 | Rosenband | G06F 3/061 711/103 |
| 2012/0124276 A1* | 5/2012 | Ahn | G06F 12/0246 711/103 |
| 2012/0131264 A1 | 5/2012 | Oikawa | |
| 2012/0191897 A1 | 7/2012 | Yang et al. | |
| 2012/0297128 A1 | 11/2012 | Eleftheriou et al. | |
| 2016/0011779 A1* | 1/2016 | Lee | G06F 3/061 711/103 |

* cited by examiner

*Primary Examiner* — Arpan P. Savla
(74) *Attorney, Agent, or Firm* — IP & T Group LLP

(57) ABSTRACT

A memory system includes a memory device including a plurality of memory chips each including a plurality of memory blocks grouped as one or more super blocks, wherein the memory blocks each include a plurality of pages suitable for storing write data requested from a host, and a controller suitable for checking a size of the write data and free pages of the super blocks, determining a first super block corresponding to the checked size of the write data based on the checked free pages among the super blocks, and programming the write data in memory blocks of the first super block.

14 Claims, 11 Drawing Sheets

MEMORY SYSTEM AND OPERATING METHOD FOR PROGRAMMING DATA IN SUPER BLOCKS

CROSS-REFERENCE TO RELATED APPLICATION

This application claims priority under 35 U.S.C. § 119 to Korean Patent Application No. 10-2015-0037268 filed on Mar. 18, 2015 in the Korean Intellectual Property Office, the disclosure of which is incorporated herein by reference in its entirety.

TECHNICAL FIELD

Exemplary embodiments of the present invention relate to a memory system and, more particularly, to a memory system which processes data from a memory device, and an operating method thereof.

DISCUSSION OF THE RELATED ART

The computing environment paradigm has shifted to ubiquitous computing systems that can be used anytime and anywhere. Because of this, the use of portable electronic devices such as mobile phones, digital cameras, and notebook computers has rapidly increased. Such portable electronic devices generally use memory systems with memory devices, that is, data storage devices. Data storage devices are used as main memory or auxiliary memory devices within the portable electronic devices.

Data storage devices provides excellent stability and durability and operate with high information access speed and low power consumption, since they have no moving parts. Examples of data storage devices having these advantages include universal serial bus (USB) memory devices, memory cards having various interfaces, and solid state drives (SSD).

SUMMARY

Various embodiments are directed to a memory system and an operating method thereof, capable of maximizing the efficiency of a memory device and quickly and stably processing data from the memory device.

In an embodiment, a memory system may include a memory device including a plurality of memory chips each including a plurality of memory blocks grouped as one or more super blocks, wherein the memory blocks each include a plurality of pages suitable for storing write data requested from a host; and a controller suitable for checking a size of the write data and free pages of the super blocks, determining a first super block corresponding to the checked size of the write data based on the checked free pages among the super blocks, and programming the write data in memory blocks of the first super block.

The controller may check program start pages and programmable pages in the respective super blocks included in the memory chips, as the free pages.

When the size of the write data is a first size, the controller may program the write data in a programmable page, starting from a program start page, in the memory blocks of the first super block, through one shot programming.

The first size may be greater than a total size of respective pages of the memory blocks of the first super block, and the programmable page may include one or more pages of each of the memory blocks of the first super block.

When the size of the write data is a second size, the controller may program the write data in a programmable page, starting from a program start page, in the memory blocks of the first super block, through multi-plane programming.

The second size may be greater than a size of one page of the memory blocks of the first super block, and the programmable page may include respective pages of two or more memory blocks of the first super block.

When the size of the write data is a third size, the controller may program the write data in a programmable page, starting from a program start page, in the memory blocks of the first super block, through one plane programming.

The third size may be equal to a size of one page of the memory blocks of the first super block, and the programmable page may include a page of one memory block of the first super block.

The third size may be smaller than a size of one page of the memory blocks of the first super block, and the controller may program dummy data or null data in a remaining page region of the programmable page, after programming the write data.

When two or more super blocks are checked as the first super block among the super blocks, the controller may determine one of the two or more super blocks as the first super block based on a priority of a page address.

When two or more super blocks are checked as the first super block among the super blocks, the controller may determine one of the two or more super block as the first super block based on program performance.

In an embodiment, a method for operating a memory system may include checking a size of write data corresponding to a write command received from a host, and checking free pages of a plurality of super blocks, wherein a plurality of memory blocks of a memory device are grouped as the super blocks and each include a plurality of pages; determining a first super block corresponding to the checked size of the write data based on the checked free pages among the super blocks; and programming the write data in memory blocks of the first super block.

The checking of the free pages may include checking program start pages and programmable pages in the respective super blocks.

When the size of the write data is a first size, the programming of the write data may include programming the write data in a programmable page in the memory blocks of the first super block, through one shot programming, wherein the programming of the write data starts from a program start page in the memory blocks of the first super block.

The first size may be greater than a total size of respective pages of the memory blocks of the first super block, and the programmable page includes one or more pages of each of the memory blocks of the first super block.

When the size of the write data is a second size, the programming of the write data may include programming the write data in a programmable page in the memory blocks of the first super block, through multi-plane programming, wherein the programming of the write data starts from a program start page in the memory blocks of the first super block.

The second size may be greater than a size of one page of the memory blocks of the first super block, and the programmable page includes respective pages of two or more memory blocks of the first super block.

When the size of the write data is a third size, the programming of the write data may include programming the write data in a programmable page in the memory blocks of the first super block, through one plane programming, wherein the programming of the write data starts from a program start page in the memory blocks of the first super block.

The third size may be equal to a size of one page of the memory blocks of the first super block, and the programmable page includes a page of one memory block of the first super block.

The third size may be smaller than a size of one page of the memory blocks of the first super block, and the programming of the write data may further include programming dummy data or null data in a remaining page region of the programmable page.

DETAILED DESCRIPTION

Figure 1:
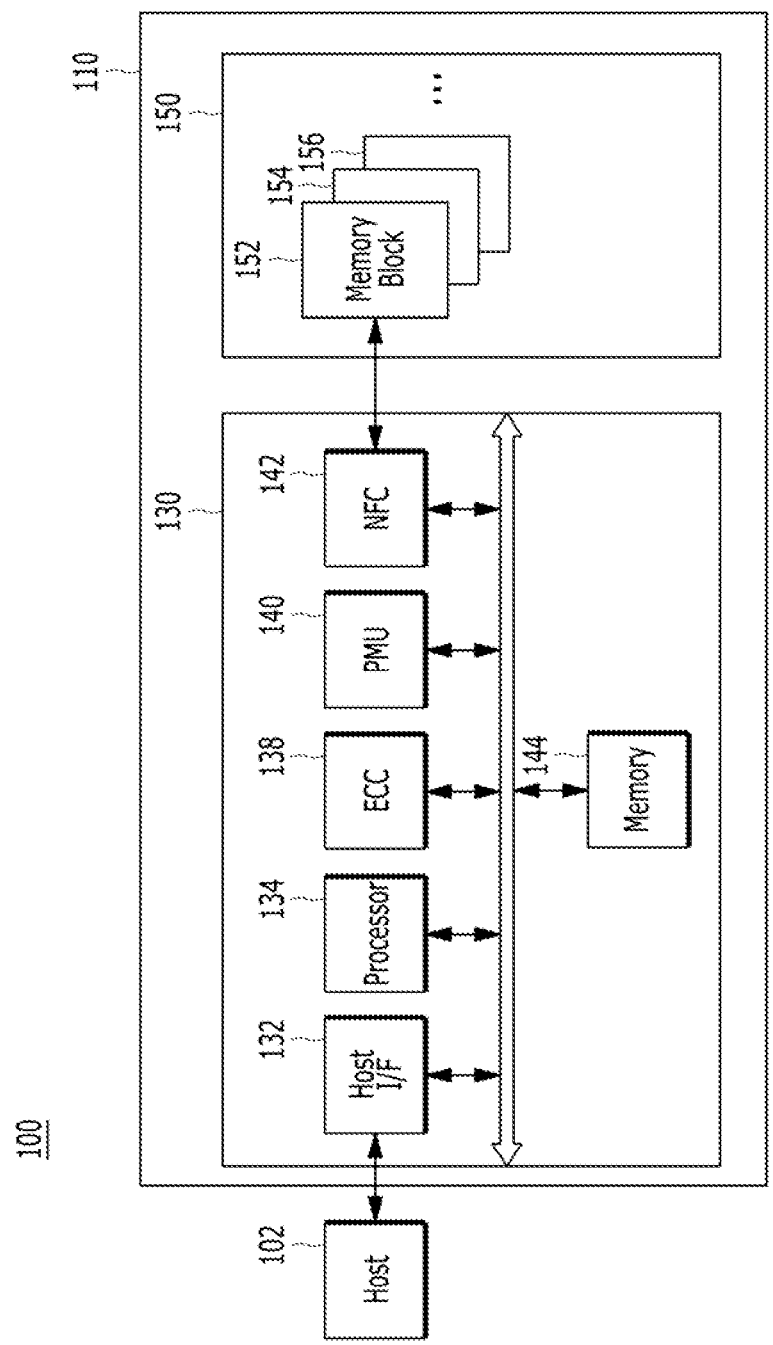
FIG. 1 is a diagram illustrating a data processing system including a memory system in accordance with an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts in the various figures and embodiments of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. Furthermore, when it is described that one "comprises" (or "includes") or "has" some elements, it should be understood that it may comprise (or include) or have only those elements, or it may comprise (or include) or have other elements as well as those elements if there is no specific limitation. The terms of singular form may include plural forms unless stated otherwise.

FIG. 1 is a diagram illustrating a data processing system including a memory system in accordance with an embodiment of the present invention.

Referring to FIG. 1, the data processing system 100 may include a host 102 and a memory system 110.

The host 102 includes, for example, a portable electronic device such as a mobile phone, an MP3 player and a laptop computer or an electronic device such as a desktop computer, a game player, a TV and a projector.

The memory system 110 operates in response to a request from the host 102, and in particular, stores data to be accessed by the host 102. In other words, the memory system 110 may be used as a main memory device or an auxiliary memory device of the host 102. The memory system 110 may be implemented with any one of various kinds of storage devices, depending on the protocol of its host interface to be electrically coupled with the host 102. For example, the memory system 110 may be implemented with any one of various kinds of storage devices such as a solid state drive (SSD), a multimedia card (MMC), an embedded MMC (eMMC), a reduced size MMC (RS-MMC), a micro-MMC, a secure digital (SD), a mini-SD, a micro-SD, a universal serial bus (USB) storage device, a universal flash storage (UFS) device, a compact flash (CF) card, a smart media (SM) card, a memory stick, and so forth.

The memory system 110 may be implemented with a volatile memory device such as a dynamic random access memory (DRAM) and a static random access memory (SRAM), or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as an SSD, the operation speed of the host 102, which is electrically coupled with the memory system 110 may be significantly increased.

The controller 130 and the memory device 150 may be integrated into one semiconductor device and configure a memory card. For example, the controller 130 and the memory card 150 may be integrated into one semiconductor device and configure a memory card such as a personal computer memory card international association (PCMCIA) card, a compact flash (CF) card, a smart media (SM) card, a memory stick, a multimedia card (MMC), an RS-MMC, a micro-MMC, a secure digital (SD), a mini-SD, a micro-SD, an SDHC, and a universal flash storage (UFS) device.

For another instance, the memory system 110 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted and, in particular, store the data provided from the host 102 during a write operation, and provide stored data to the host 102 during a read operation. The memory device 150 includes a plurality of memory blocks 152, 154 and 156. Each of the memory blocks 152, 154 and 156 includes a plurality of pages. Each of the pages includes a plurality of memory cells to which a plurality of word lines (WL) are electrically coupled. The memory device 150 may be a nonvolatile memory device, for example, a flash memory. The flash memory may have a three-dimensional (3D) stack structure. The structure of the memory device 150, that is, the three-dimensional (3D) stack structure of the memory device 150 will be described later in detail with reference to FIGS. 2 to 11.

The controller 130 of the memory system 110 controls the memory device 150 in response to a request from the host 102. For example, the controller 130 provides the data read from the memory device 150, to the host 102, and stores the data provided from the host 102, in the memory device 150. To this end, the controller 130 controls overall operations of the memory device 150, such as read, write, program and erase operations.

In detail, the controller 130 includes a host interface unit 132, a processor 134, an error correction code (ECC) unit 138, a power management unit 140, a NAND flash controller 142, and a memory 144.

The host interface unit 132 processes commands and data provided from the host 102, and may be configured to communicate with the host 102 through one or more of various interface protocols such as a universal serial bus (USB), a multimedia card (MMC), a peripheral component interconnect-express (PCI-E), a serial advanced technology attachment (SATA), a parallel advanced technology attachment (PATA), a small computer system interface (SCSI), a serial-attached SCSI (SAS), an enhanced small disk interface (ESDI), and an integrated drive electronics (IDE).

The ECC unit 138 detects and corrects an error included in the data read from the memory device 150 during the read operation. That is, after having performed an error correction decoding operation on the data read from the memory device 150, the ECC unit 138 may determine whether the error correction decoding operation has succeeded, output an indication signal in response to a determination result, and correct an error bit of the read data based on a parity bit generated by an ECC encoding process. When the number of the error bits is greater than or equal to a threshold number of correctable error bits, the DDC unit 138 may not correct the error bits and may output an error correction fail signal.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolutional code, a recursive systematic code (RSC), a trellis-coded modulation (TCM), a block coded modulation (BCM), and so on. The ECC unit 138 may include all circuits, systems or devices for the error correction operation.

The NFC 142 serves as a memory interface between the controller 130 and the memory device 150 to allow the controller 130 to control the memory device 150 in response to a request from the host 102. The NFC 142 generates control signals and processes data for the memory device 150 under the control of the processor 134, when the memory device 150 is a flash memory and, in particular, a NAND flash memory.

The memory 144 serves as a working memory of the memory system 110 and the controller 130, and stores data for driving the memory system 110 and the controller 130. The controller 130 controls the memory device 150 in response to a request from the host 102. For example, the controller 130 provides the data read from the memory device 150 to the host 102, and stores the data provided from the host 102 in the memory device 150. To this end, the controller 130 controls the operations of the memory device 150, such as read, write, program and erase operations, and the memory 144 stores data needed to allow such operations.

The memory 144 may be implemented with volatile memory. For example, the memory 144 may be implemented with a static random access memory (SRAM) or a dynamic random access memory (DRAM). As described above, the memory 144 stores data needed to perform the read and write operations between the host 102 and the memory device 150. To store the data, the memory 144 includes a program memory, a data memory, a write buffer, a read buffer, a map buffer, and so forth.

The processor 134 controls general operations of the memory system 110, and controls a write operation or a read operation for the memory device 150, in response to a write request or a read request from the host 102. The processor 134 drives firmware, which is referred to as a flash translation layer (FTL), to control the general operations of the memory system 110. The processor 134 may be implemented with a microprocessor or a central processing unit (CPU).

A management unit (not shown) for performing "bad management," for example, bad block management, of the memory device 150 is included in the processor 134. The management unit checks the plurality of memory blocks included in the memory device 150, finds those that are bad (are in unsatisfactory condition for further use) and performs bad block management. When the memory device 150 is a flash memory, for example, a NAND flash memory, a program failure may occur during the write operation, for example, during the program operation, due to characteristics of a NAND logic function. "Bad block management," are operations for processing memory blocks in which a program failure has occurred, as bad, and programming the data that has failed to be programmed in a new memory block. Hereinbelow, the memory device in the memory system in accordance with an embodiment will be described in detail with reference to FIGS. 2 to 11.

Figure 2:
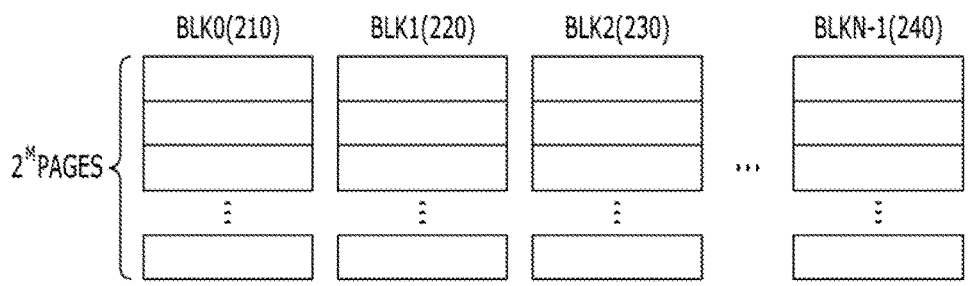
FIG. 2 is a diagram illustrating a memory device in the memory system shown in FIG. 1.

FIG. 2 is a diagram illustrating the memory device 150 in the memory system 110 shown in FIG. 1.

Referring to FIG. 2, the memory device 150 includes a plurality of memory blocks, for example, a zeroth memory block (BLK0) 210, a first memory block (BLK1) 220, a second memory block (BLK2) 230 and an N-1$^{th}$ memory block (BLKN-1) 240. Each of the memory blocks 210, 220, 230 and 240 includes a plurality of pages, for example, $2^M$ number of pages ($2^M$ PAGES). While it is described that each of the plurality of memory blocks includes $2^M$ number of pages, it is to be noted that each of the plurality of memory blocks may include M number (or any number) of pages. Each of the pages includes a plurality of memory cells to which a plurality of word lines (WL) are electrically coupled.

Also, the memory device 150 may include a plurality of memory blocks, as single level cell (SLC) memory blocks and multi-level cell (MLC) memory blocks, depending on the number of bits which are stored in each memory cell. The SLC memory block includes a plurality of pages which are implemented with memory cells each capable of storing 1-bit data, and may have high data calculation performance and superior durability. The MLC memory block includes a plurality of pages which are implemented with memory cells each capable of storing multi-bit data, for example, two or more-bit data, and may have a data storage space larger than the SLC memory block, that is, may be highly integrated. An MLC memory block including a plurality of pages which are implemented with memory cells that are each capable of storing 3-bit data may be defined as a triple level cell (TLC) memory block.

Each of the memory blocks 210, 220, 230 and 240 stores the data provided from the host device 102 of FIG. 1 during a write operation, and provides stored data to the host 102 during a read operation.

Figure 3:
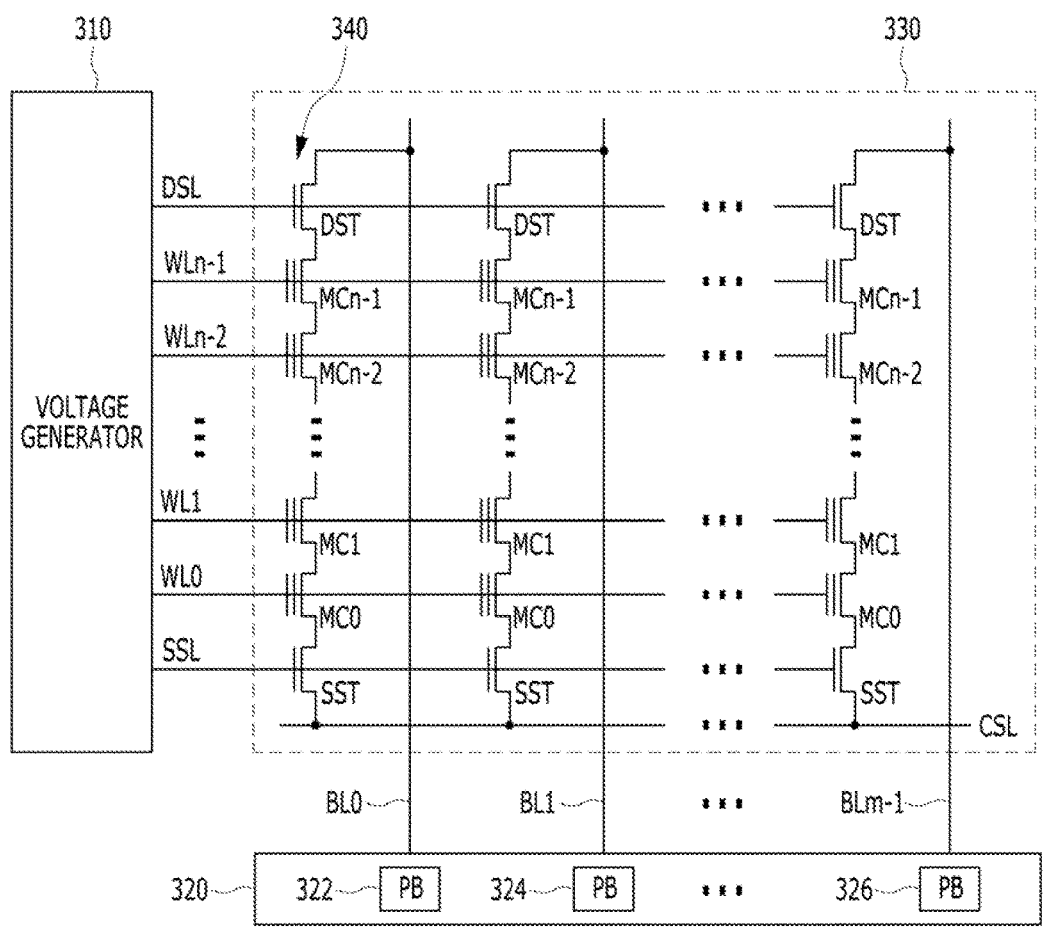
FIG. 3 is a circuit diagram illustrating a memory block in a memory device in accordance with an embodiment.

FIG. 3 is a circuit diagram illustrating a memory block in a memory device in accordance with an embodiment of the present invention.

Referring to FIG. 3, the memory block 330 of the memory device 300 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured as multi-level cells (MLC) each of which stores data information of a plurality of bits. The strings 340 may be electrically coupled to the corresponding bit lines BL0 to BLm−1, respectively. For reference, in FIG. 3, 'DSL' denotes a drain select line, and 'SSL' denotes a source select line, and 'CSL' denotes a common source line.

While FIG. 3 shows, as an example, the memory block 330 that includes NAND flash memory cells, it is to be noted that the memory block 330 of the memory device 300 in accordance with an embodiment is not limited to NAND flash memory and may be realized as NOR flash memory, hybrid flash memory in which two or more kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example, a program voltage, a read voltage and a pass voltage, to respective word lines based on an operation mode and may provide voltages to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 is controlled by the control circuit, and may serve as a sense amplifier or a write driver based on an operation mode. For example, during a verification or read operation, the read/ write circuit 320 may serve as a sense amplifier for sensing data from the memory cell array. Also, during a program operation, the read/write circuit 320 may serve as a write driver which drives bit lines based on data to be stored in the memory cell array. The read/write circuit 320 may receive data to be written in the memory cell array, from a buffer (not shown), during the program operation, and may drive the bit lines based on the received data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

Hereinbelow, detailed descriptions for the memory device 150 will be made with reference to FIGS. 4 to 11, when the memory device 150 is implemented with a three-dimensional (3D) nonvolatile memory device in accordance with an embodiment.

Figure 4:
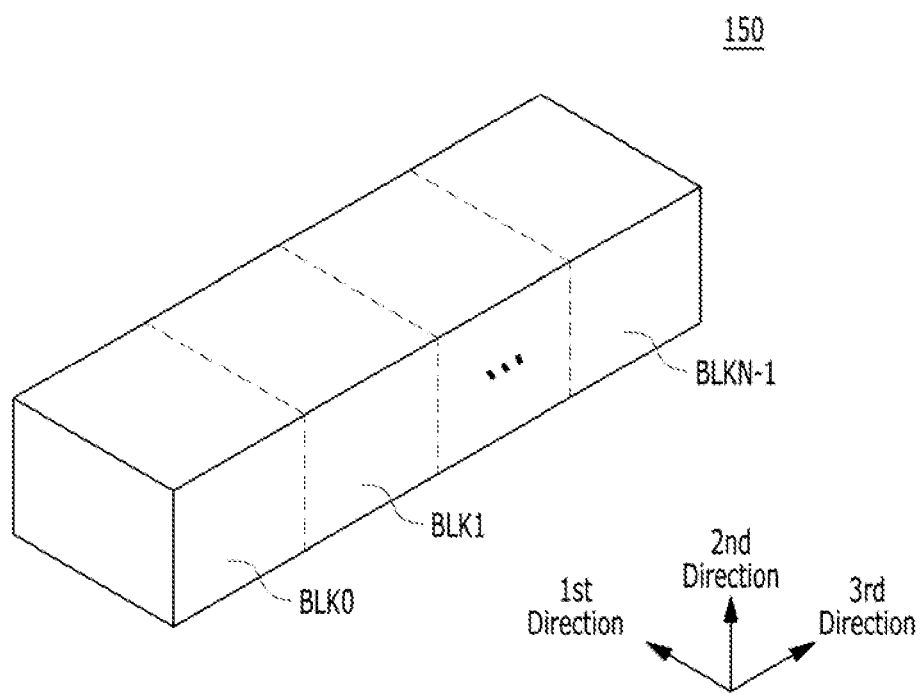
FIGS. 4 to 11 are diagrams schematically illustrating the memory device shown in FIG. 2.

FIG. 4 is a block diagram illustrating the memory blocks LK0 to BLKN−1 of the memory device 150 shown in FIG. 2.

Referring to FIG. 4, the memory device 150 may include the plurality of memory blocks BLK0 to BLKN−1, and each of the memory blocks BLK0 to BLKN−1 may be realized in a three-dimensional (3D) structure or a vertical structure. Each of the memory blocks BLK0 to BLKN−1 may include structures which extend in first to third directions (i.e., an x-axis direction, a y-axis direction and a z-axis direction.)

Each of memory blocks BLK0 to BLKN−1 may include a plurality of NAND strings NS which extend in the second direction. The plurality of NAND strings NS may be arranged in the first direction and the third direction. Each NAND string NS may be electrically coupled to a bit line BL, one or more source select lines SSL, one or more ground select lines GSL, a plurality of word lines WL, one or more dummy word lines DWL, and a common source line CSL. Namely, each of the memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
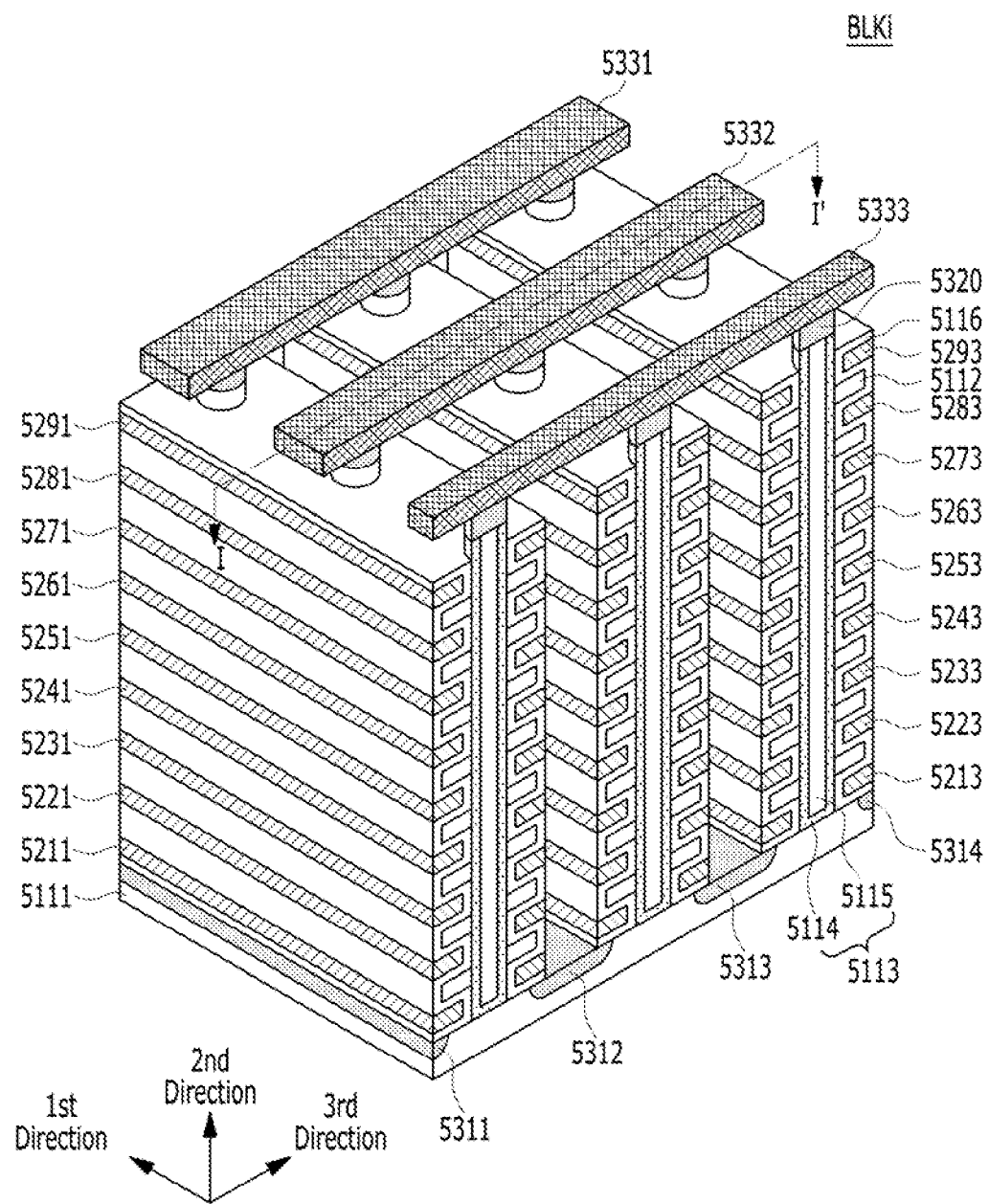
Figure 6:
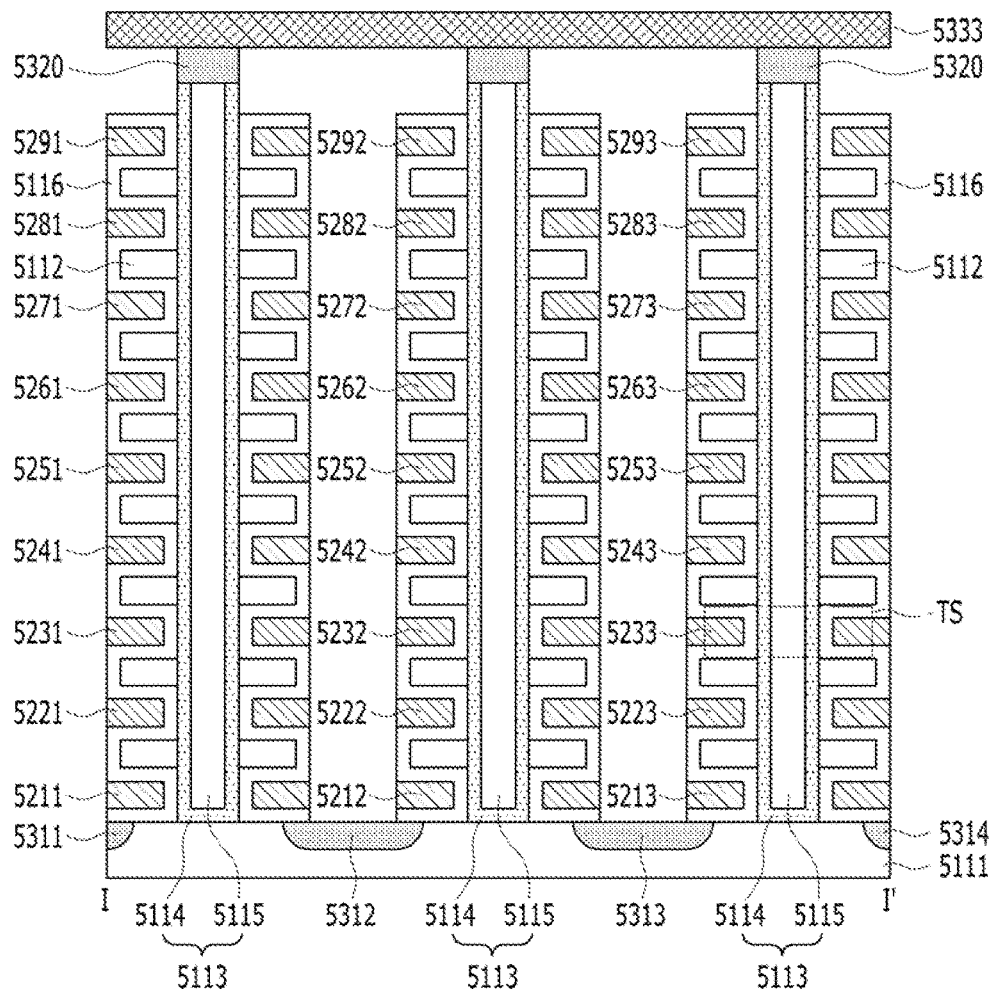

FIG. 5 is a perspective view of one memory block BLKi of the memory blocks BLK0 to BLKN−1 shown in FIG. 4. FIG. 6 is a cross-sectional view taken along a line I-I' of the memory block BLKi shown in FIG. 5.

Referring to FIGS. 5 and 6, the memory block BLKi of the memory device 150 may include a structure which extends in the first to third directions.

A substrate 5111 may be provided. The substrate 5111 may include a silicon material doped with a first type impurity. For example, the substrate 5111 may include a silicon material doped with a p-type impurity, or may be a p-type well, for example, a pocket p-well, and include an n-type well which surrounds the p-type well. While it is described in the embodiment that the substrate 5111 is p-type silicon, it is to be noted that the substrate 5111 is not limited to being p-type silicon.

A plurality of doping regions 5311 to 5314 which extend in the first direction may be provided over the substrate 5111. The plurality of doping regions 5311 to 5314 may contain a second type of impurity that is different from the substrate 5111. The plurality of doping regions 5311 to 5314 may be doped with an n-type impurity. While it is described in the embodiment that first to fourth doping regions 5311 to 5314 are n-type, it is to be noted that the first to fourth doping regions 5311 to 5314 are not limited to being n-type.

A plurality of dielectric materials 5112 which extend in the first direction may be sequentially provided in the second direction over a region of the substrate 5111 between the first and second doping regions 5311 and 5312. The plurality of dielectric materials 5112 and the substrate 5111 may be separated from one another by a predetermined distance in the second direction. The plurality of dielectric materials 5112 may be separated from one another by a predetermined distance in the second direction. The dielectric materials 5112 may include a dielectric material such as silicon oxide.

A plurality of pillars 5113 may be sequentially disposed in the first direction over a region of the substrate 5111 between the first and second doping regions 5311 and 5312, and may pass through the dielectric materials 5112 in the second direction. The plurality of pillars 5113 may pass through the dielectric materials 5112 and may be electrically coupled with the substrate 5111. Each pillar 5113 may be configured by a plurality of materials. A surface layer 5114 of each pillar 5113 may include a silicon material doped with the first type of impurity. The surface layer 5114 of each pillar 5113 may include a silicon material doped with the same type of impurity as the substrate 5111. While it is described in the embodiment that the surface layer 5114 of each pillar 5113 includes p-type silicon, it is to be noted that the surface layer 5114 of each pillar 5113 is not limited to p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be smaller than half of the distance between the dielectric materials 5112. In other words, a region for a material other than the dielectric material 5112 and the dielectric layer 5116 to be disposed may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. For example, the conductive material 5211 which extends in the first direction may be provided between the dielectric material 5112 adjacent to the substrate 5111 and the substrate 5111. In particular, the conductive material 5211 may be provided between (i) the dielectric layer 5116 disposed over the substrate 5111 and (ii) the dielectric layer 5116 disposed over the bottom surface of the dielectric material 5112 adjacent to the substrate 5111.

For another example, the conductive materials 5221 to 5281 which extend in the first direction may be provided between (I) the dielectric layer 5116 disposed over the top surface of a certain dielectric material of the dielectric materials 5112 and (ii) the dielectric layer 5116 disposed over the bottom surface of another dielectric material of the dielectric materials 5112, which is disposed over the certain dielectric material 5112. The conductive material 5291 which extends in the first direction may be provided over the uppermost dielectric material 5112. The conductive materials 5211 to 5291 may be a metallic material. For example, the conductive materials 5211 to 5291 may be polysilicon.

The same structures as the structures between the first and second doping regions 5311 and 5312 may be provided between the second and third doping regions 5312 and 5313. For example, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided between the second and third doping regions 5312 and 5313.

The same structures as the structures between the first and second doping regions 5311 and 5312 may be provided between the third and fourth doping regions 5313 and 5314. For example, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided between the third and fourth doping regions 5313 and 5314.

Drains 5320 may be respectively provided over the plurality of pillars 5113. The drains 5320 may be silicon materials doped with second type impurities. The drains 5320 may be silicon materials doped with n-type impurities. While it is described that the drains 5320 include n-type silicon, it is to be noted that the drains 5320 are not limited to n-type silicon. The width of each drain 5320 may be larger than the width of each corresponding pillar 5113. For example, each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The conductive materials 5331 to 5333 may be electrically coupled with the drains 5320 of corresponding regions. The drains 5320 and the conductive materials 5331 to 5333 may be electrically coupled with each other through contact plugs. The conductive materials 5331 to 5333 may be a metallic material. For example, the conductive materials 5331 to 5333 may be polysilicon.

In FIGS. 5 and 6, the respective pillars 5113 may form strings together with the dielectric layer 5116 and the conductive materials 5211 to 5291, 5212 to 5292 and 5213 to 5293 which extend in the first direction. For example, the respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
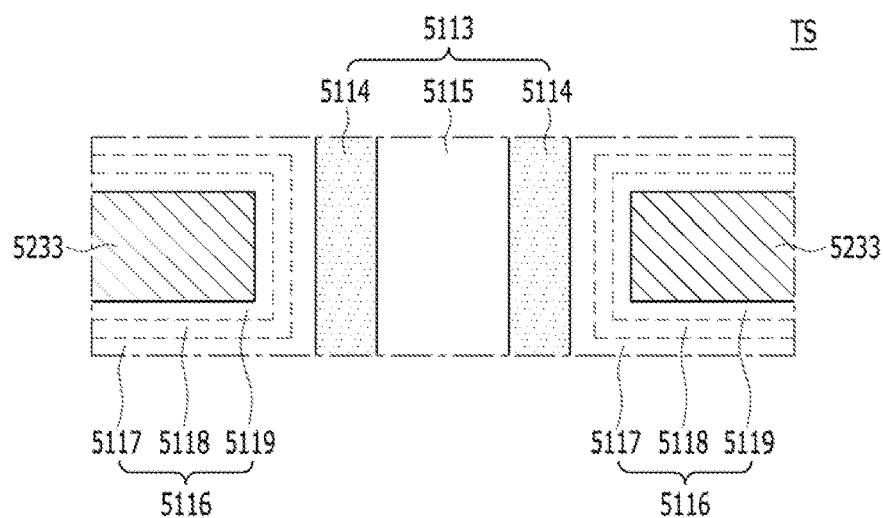

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. For example, the second sub dielectric layer 5118 may serve as a charge capturing/trapping layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. For example, the third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or control gate. That is, the gate or control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for a simplified explanation, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. One or more of the plurality of transistor structures TS of each NAND string NS may serve as a source select transistor SST. One or more of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. In other words, the gates or control gates may extend in the first direction and form word lines and two or more select lines, for example, one or more source select lines SSL and one or more ground select lines GSL.

The conductive materials 5331 to 5333 which extend in the third direction may be electrically coupled to one end of the NAND strings NS. For example, the conductive materials 5331 to 5333 may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 may serve as common source lines CSL.

Namely, the memory block BLKi includes a plurality of NAND strings NS which extend in a direction perpendicular to the substrate 5111, e.g., the second direction, and may serve as a NAND flash memory block, for example, of a charge capturing type memory, in which the plurality of NAND strings NS are electrically coupled to one bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 are not limited to 9 layers. For example, conductive materials which extend in the first direction may have 8 layers, 16 layers or any multiple of layers. In other words, in one NAND string NS, there may be any number of transistors.

While it is illustrated in FIGS. 5 to 7 that 3 NAND strings NS are electrically coupled to one bit line BL, it is to be noted that the embodiment is not limited to the 3 NAND strings NS. For example, in the memory block BLKi, m number of NAND strings NS may be electrically coupled to one bit line BL, m being a positive integer. Depending on the number of NAND strings NS which are electrically coupled to one bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to the 3 NAND strings NS. For example, n number of NAND strings NS may be electrically coupled to one conductive material which extends in the first direction, n being a positive integer. Depending on the number of NAND strings NS which are electrically coupled to one conductive material which extends in the first direction, the number of bit lines 5331 to 5333 may be controlled as well.

Figure 8:
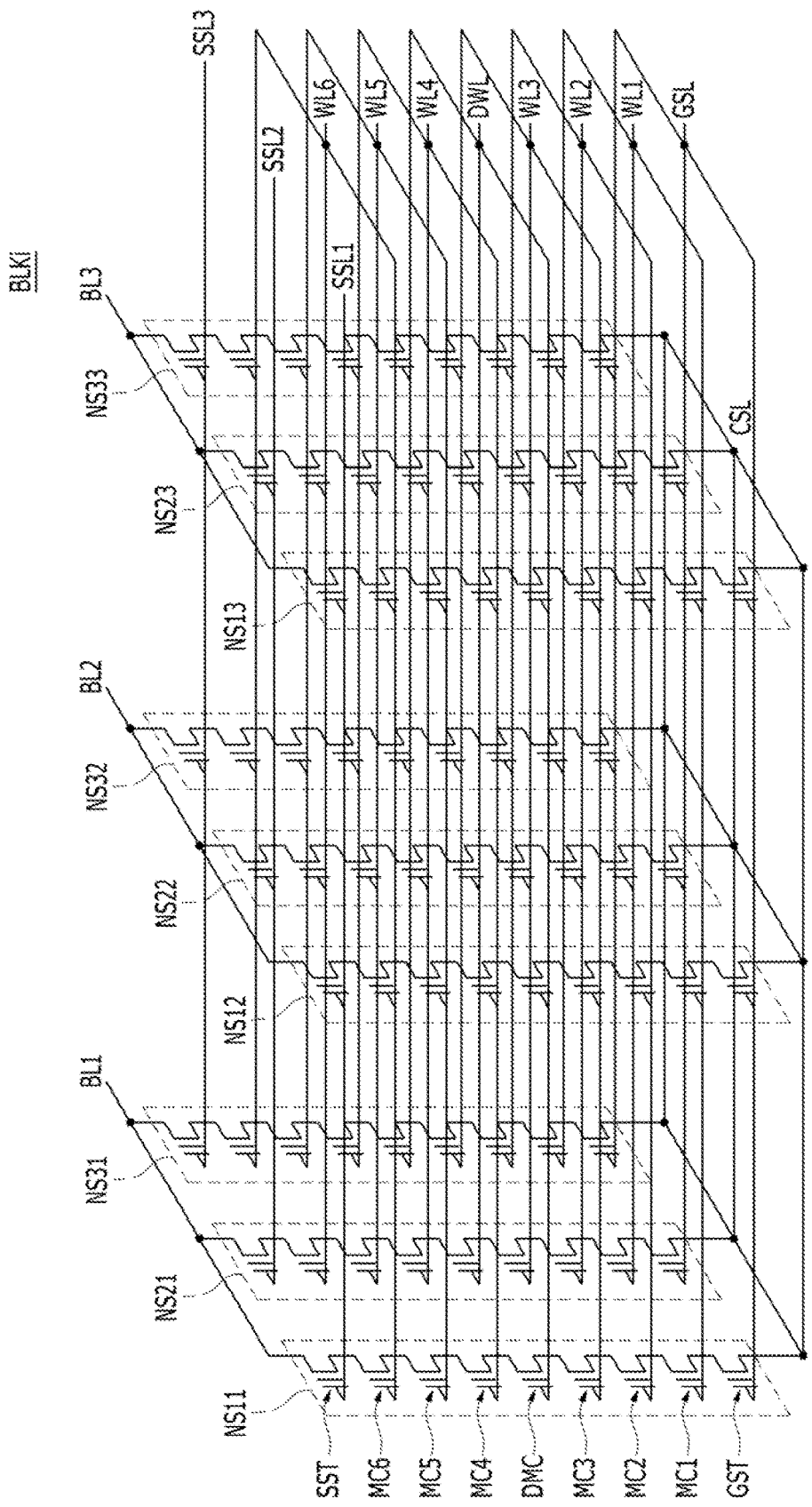

FIG. 8 is an equivalent circuit diagram illustrating the memory block BLKi having a first structure described with reference to FIGS. 5 to 7.

Referring to FIG. 8, in the certain block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In the embodiment, for a simplified explanation, the NAND strings NS may be defined on the basis of rows and columns and NAND strings NS which are electrically coupled to one bit line may form one column. For example, the NAND strings NS11 to NS31 which are electrically coupled to the first bit line BL1 may correspond to a first column, and the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. For example, the NAND strings NS11 to NS13 which are electrically coupled to a first source select line SSL1 may form a first row, and the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined for a transistor and a memory cell. In each NAND string NS, the height of a memory cell may increase as the memory cell gets closer to the source select transistor SST when measured from the substrate 5111. For example, in each NAND string NS, the height of a memory cell MC6 adjacent to the source select transistor SST is 7 while the height of a memory cell MC1 adjacent to the ground select transistor GST is 1.

The source select transistors SST of the NAND strings NS in the same row may share the source select line SSL. The source select transistors SST of the NAND strings NS in different rows may be electrically coupled to the different source select lines SSL1, SSL2 and SSL3.

Memory cells at the same height in the NAND strings NS in the same row may share a word line WL. At the same height, word lines WL electrically coupled to the memory cells MC of the NAND strings NS in different rows may be electrically coupled. Dummy memory cells DMC at the same height in the NAND strings NS of the same row may share a dummy word line DWL. At the same height, dummy word lines DWL electrically coupled to the dummy memory cells DMC of the NAND strings NS in different rows may be electrically coupled.

For example, the word lines WL or the dummy word lines DWL located at the same height may be electrically coupled at layers where the conductive materials 5211 to 5291, 5212 to 5292 and 5213 to 5293 which extend in the first direction are provided. For example, the conductive materials 5211 to 5291, 5212 to 5292 and 5213 to 5293 which extend in the first direction at a given layer may be electrically coupled to an upper layer through contacts. At the upper layer, the conductive materials 5211 to 5291, 5212 to 5292 and 5213 to 5293 which extend in the first direction may be electrically coupled. In other words, the ground select transistors GST of the NAND strings NS in the same row may share a ground select line GSL. Further, the ground select transistors GST of the NAND strings NS in different rows may share ground select lines GSL coupled to one another. That is, the NAND strings NS 11 to NS13, NS21 to NS23 and NS31 to NS33 may be electrically coupled to the ground select lines GSL.

The common source line CSL may be electrically coupled to the NAND strings NS. For example, over the active regions over the substrate 5111, the first to fourth doping regions 5311 to 5314 may be electrically coupled. For example, the first to fourth doping regions 5311 to 5314 may be electrically coupled to an upper layer through contacts and, at the upper layer, the first to fourth doping regions 5311 to 5314 may be electrically coupled.

Namely, as shown in FIG. 8, the word lines WL of the same height may be electrically coupled. Accordingly, when a certain word line WL at a specific height is selected, all NAND strings NS which are electrically coupled to the certain word line WL may be selected. The NAND strings NS in different rows may be electrically coupled to different source select lines SSL. Accordingly, among the NAND strings NS electrically coupled to the same word line WL, the NAND strings NS in the unselected rows may be electrically isolated from the bit lines BL1 to BL3 by selecting one of the source select lines SSL1 to SSL3. In other words, a row of NAND strings NS may be selected by selecting one of the source select lines SSL1 to SSL3. Moreover, the NAND strings NS in the selected rows may be selected in units of columns by selecting one of the bit lines BL1 to BL3.

In each NAND string NS, a dummy memory cell DMC may be provided. In FIG. 8, the dummy memory cell DMC is provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST, may be referred to as a lower memory cell group, and memory cells, for example, MC4 to MC6, adjacent to the source select transistor SST, may be referred to as an upper memory cell group.

Hereinbelow, detailed descriptions will be made with reference to FIGS. 9 to 11, when a memory device in a memory system in accordance with an embodiment is implemented with a three-dimensional (3D) nonvolatile memory device of a second structure that is different from the first structure.

Figure 9:
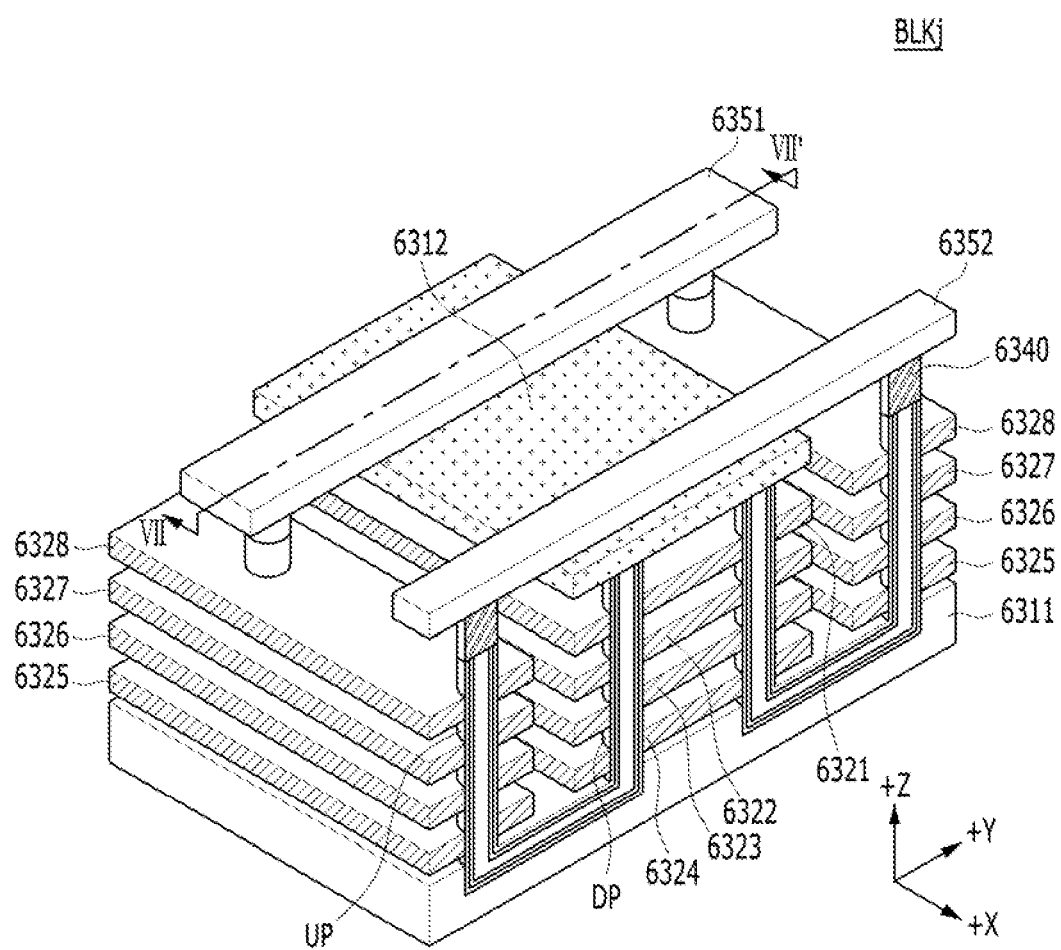

FIG. 9 is a perspective view schematically illustrating the memory device implemented with the three-dimensional (3D) nonvolatile memory device in accordance with the embodiment, which has the second structure that is different from the first structure described above with reference to FIGS. 5 to 8. FIG. 9 shows one memory block BLKj having the second structure in the plurality of memory blocks of FIG. 4, and FIG. 10 is a cross-sectional view illustrating the memory block BLKj and taken along the line VII-VII' of FIG. 9.

Figure 10:
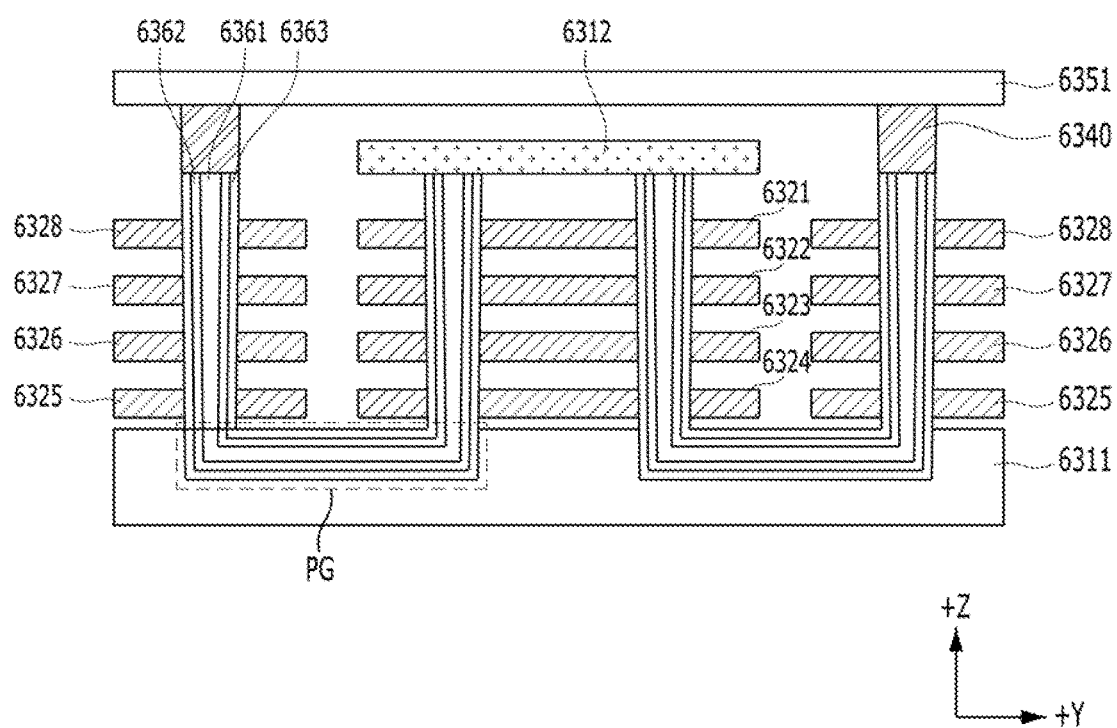

Referring to FIGS. 9 and 10, the memory block BLKj may include structures which extend in the first to third directions.

A substrate 6311 may be provided. For example, the substrate 6311 may include a silicon material doped with a first type impurity. For example, the substrate 6311 may include a silicon material doped with a p-type impurity, or may be a p-type well, for example, a pocket p-well, and include an n-type well which surrounds the p-type well. While it is described in the embodiment for a simplified explanation that the substrate 6311 is p-type silicon, it is to be noted that the substrate 6311 is not limited to being p-type silicon.

First to fourth conductive materials 6321 to 6324 which extend in the x-axis direction and the y-axis direction are provided over the substrate 6311. The first to fourth conductive materials 6321 to 6324 are separated by a predetermined distance in the z-axis direction.

Fifth to eighth conductive materials 6325 to 6328 which extend in the x-axis direction and the y-axis direction are provided over the substrate 6311. The fifth to eighth conductive materials 6325 to 6328 are separated by the predetermined distance in the z-axis direction. The fifth to eighth conductive materials 6325 to 6328 are separated from the first to fourth conductive materials 6321 to 6324 in the y-axis direction.

A plurality of lower pillars DP which pass through the first to fourth conductive materials 6321 to 6324 are provided. Each lower pillar DP extends in the z-axis direction. Also, a plurality of upper pillars UP which pass through the fifth to eighth conductive materials 6325 to 6328 are provided. Each upper pillar UP extends in the z-axis direction.

Each of the lower pillars DP and the upper pillars UP includes an internal material 6361, an intermediate layer 6362, and a surface layer 6363. The intermediate layer 6362 serves as a channel of the cell transistor. The surface layer 6363 includes a blocking dielectric layer, a charge storing layer and a tunneling dielectric layer.

The lower pillar DP and the upper pillar UP are electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction is provided over the lower pillars DP. For example, the doping material 6312 of the second type may include an n-type silicon material. The doping material 6312 of the second type serves as a common source line CSL.

Drains 6340 are provided over the upper pillars UP. For example, the drains 6340 may include an n-type silicon material. First and second upper conductive materials 6351 and 6352 which extend in the y-axis direction are provided over the drains 6340.

The first and second upper conductive materials 6351 and 6352 are separated in the x-axis direction. The first and second upper conductive materials 6351 and 6352 may be formed of a metal. The first and second upper conductive materials 6351 and 6352 and the drains 6340 may be electrically coupled with each other through contact plugs. The first and second upper conductive materials 6351 and 6352 respectively serve as first and second bit lines BL1 and BL2.

The first conductive material 6321 serves as a source select line SSL, and the second conductive material 6322 serves as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, and the seventh conductive material 6327 serves as a second dummy word line DWL2, and the eighth conductive material 6328 serves as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string are electrically coupled through the pipe gate PG. One end of the lower string is electrically coupled to the doping material 6312 of the second type which serves as the common source line CSL. One end of the upper string is electrically coupled to a corresponding bit line through the drain 6340. One lower string and one upper string form one cell string which is electrically coupled between the doping material 6312 of the second type, serving as the common source line CSL, and a corresponding one of the upper conductive material layers 6351 and 6352, serving as the bit line BL.

That is, the lower string includes a source select transistor SST, a first dummy memory cell DMC1, and first and second main memory cells MMC1 and MMC2. The upper string includes third and fourth main memory cells MMC3 and MMC4, a second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
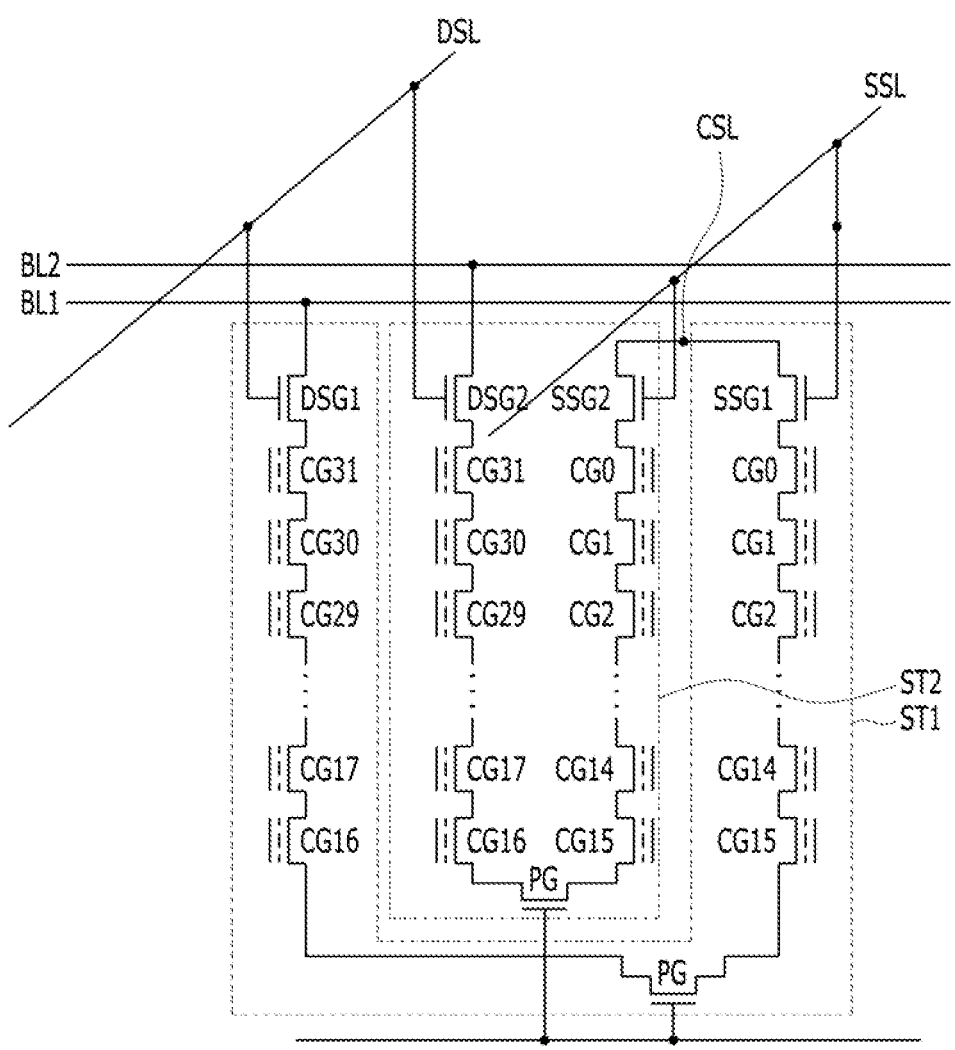

FIG. 11 is an equivalent circuit diagram illustrating the memory block BLKj having the second structure as described above with reference to FIGS. 9 and 10. For a simplified explanation, only a first string and a second string, which form a pair in the memory block BLKj realized in the second structure, are shown.

Referring to FIG. 11, in the memory block BLKj having the second structure, as described above with reference to FIGS. 9 and 10, cell strings, each of which is implemented with one upper string and one lower string electrically coupled through the pipe gate PG, may be provided in pairs.

In the memory block BLKj having the second structure, memory cells CG0 to CG31 stacked along a first channel CH1 (not shown), for example, one or more source select gates SSG1 and one or more drain select gates DSG1 may form a first string ST1, and memory cells CG0 to CG31 stacked along a second channel CH2 (not shown), for example, one or more source select gates SSG2 and one or more drain select gates DSG2 may form a second string ST2.

The first string ST1 and the second string ST2 are electrically coupled to the same drain select line DSL and the same source select line SSL. The first string ST1 is electrically coupled to a first bit line BL1, and the second string ST2 is electrically coupled to a second bit line BL2.

While it is described in FIG. 11 that the first string ST1 and the second string ST2 are electrically coupled to the same drain select line DSL and the same source select line SSL, the first string ST1 and the second string ST2 may be electrically coupled to the same source select line SSL and the same bit line BL, and the first string ST1 is electrically coupled to a first drain select line DSL1 and the second string ST2 is electrically coupled a second drain select line DSL2. In another embodiment, the first string ST1 and the second string ST2 may be electrically coupled to the same drain select line DSL and the same bit line BL, and the first string ST1 is electrically coupled to a first source select line SSL1 and the second string ST2 is electrically coupled a second source select line SSL2. Hereinbelow, detailed descriptions will be made with reference to FIGS. 12 and 13, for data processing, particularly, data programming, that is, a data write operation, with respect to a memory device in a memory system in accordance with an embodiment.

Figure 12:
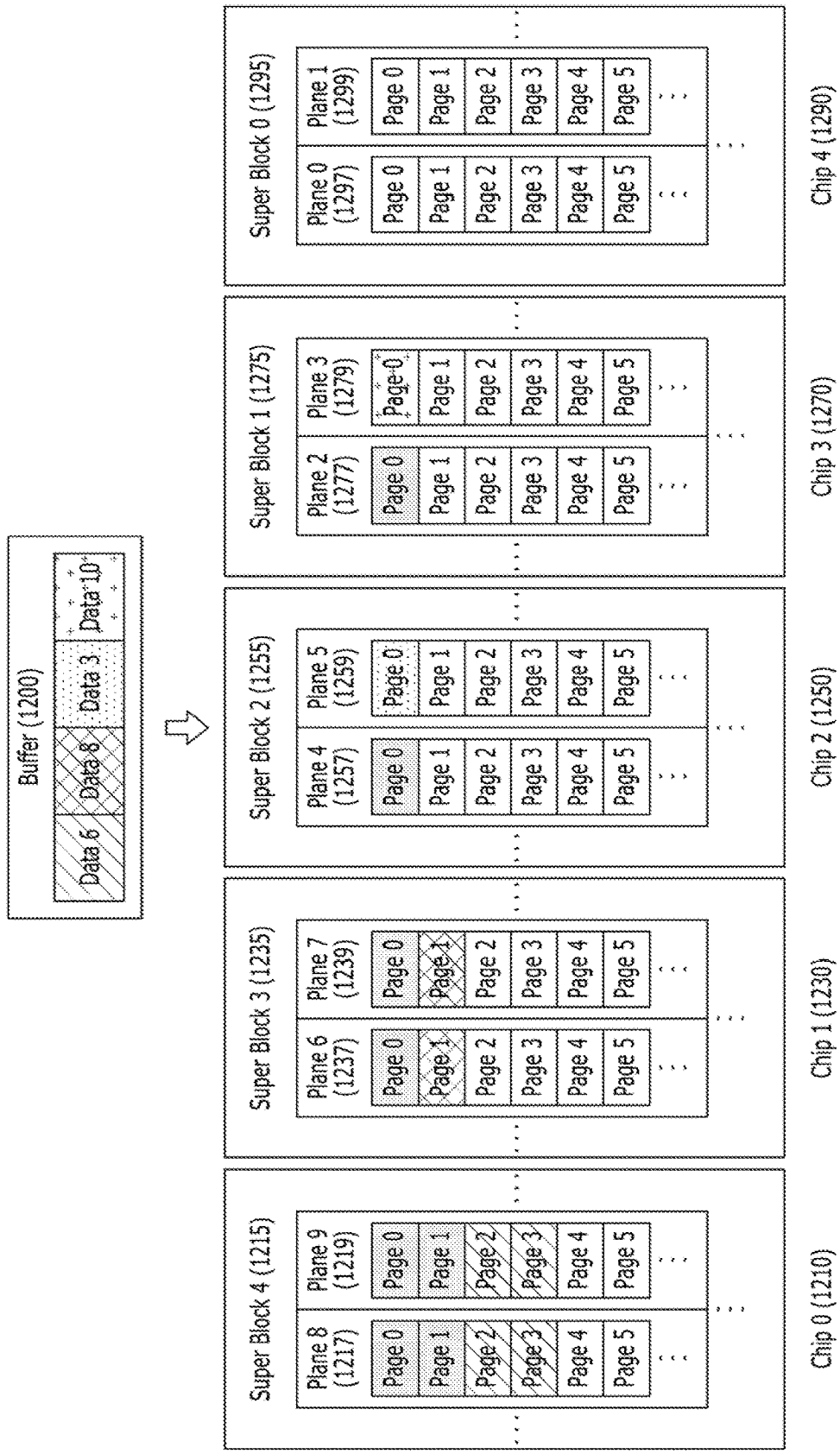
FIG. 12 is a schematic diagram illustrating a data processing operation of a memory device in the memory system in accordance with the embodiment.

FIG. 12 is a schematic diagram illustrating a data processing operation of the memory device in the memory system in accordance with the embodiment. Hereinbelow, descriptions will be made for data processing in the memory system 110 shown in FIG. 1. For example, before programming write data, corresponding to a write command received from the host 102, in the memory blocks 152 to 156 included in the memory device 150, the memory system 110 may store the write data in a buffer/cache included in the memory 144 of the controller 130, for example, a write buffer/cache. At this time, the write data stored in the buffer/cache may be programmed/written in the pages of corresponding memory blocks, in consideration of the size of the write data and the size of the pages of the corresponding memory.

Further, while it will be described below as an example that the controller 130 performs a data processing operation in the memory system 110, it is to be noted that, as described above, the processor 134 included in the controller 130 may perform the data processing operation. Also, while it will be described below as an example that write data corresponding to the write command received from the host 102 are stored in the buffer/cache included in the memory 144 of the controller 130, it is to be noted that the write data may be stored in the plurality of page buffers 322, 324 and 326 or a plurality of latches included in the memory device 300 described above with reference to FIG. 3, or an external memory device.

Moreover, in the following embodiment, data corresponding to the write command received from the host 102 are stored in a buffer/cache. After checking the size, for example, the chunk size, of the data stored in the buffer/cache, the data are programmed/written in the pages of corresponding memory blocks of the memory device 150, by checking free pages corresponding to the checked size of the data, that is, by checking pages capable of programming/writing the data. Free pages may be defined by representing a page starting to program/write the data and the number or size thereof.

In the embodiment, in memory chips in which the plurality of memory blocks of the memory device 150 are realized, the memory blocks are grouped into super blocks. By checking free pages in the super blocks, data corresponding to the write command received from the host 102 are programmed in the super blocks of the memory device 150 through one shot programming, multi-plane programming and one plane programming. Hereafter, it will be described as an example that data with the chunk size of 64 KB may be simultaneously programmed/written in the pages included in super blocks, through one shot programming, and data with the chunk size of 32 KB may be simultaneously programmed/written in the pages included in super blocks, through multi-plane programming, and data with the chunk size of 16 KB may be simultaneously programmed/written in the pages included in super blocks, through one plane programming.

Referring to FIG. 12, the controller 130 stores write data corresponding to the write command received from the host 102, in a buffer 1200 included in the memory 144 of the controller 130, and then, programs, that is, writes and stores, the data stored in the buffer 1200 in a plurality of memory chips in which the plurality of memory blocks are realized.

For example, in detail, the controller 130 stores write data corresponding to the write command received from the host 102, for example, data 6, data 8, data 3 and data 10, in the buffer 1200.

The controller 130 checks the sizes of the data stored in the buffer 1200, that is, the chunk sizes of the data 6, the data 8, the data 3 and the data 10. Hereinbelow, it will be described as an example that the chunk size of the data 6 is 64 KB, and the chunk size of the data 8 is 32 KB, and the chunk size of the data 3 is 16 KB, and the chunk size of the data 10 is 8 KB.

The memory device 150 includes, as described above, a plurality of memory chips in which a plurality of memory blocks are realized, for example, zeroth to fourth memory chips 1210 to 1290. The plurality of memory blocks included in each of the memory chips 1210, 1230, 1250, 1270 and 1290 in the memory device 150 are grouped as super blocks.

Hereinafter, it will be described as an example that two memory blocks are grouped into one super block. However, it is to be noted that two or more memory blocks may be grouped into one super block depending on the capacity and the data program performance of the memory device 150 and a plurality of super blocks into each of which a plurality of memory blocks are grouped may be included in each of the memory chips 1210 to 1290. Also, hereinafter, it will be described as an example that the same number of memory blocks are grouped into one super block in the memory chips 1210, 1230, 1250, 1270 and 1290, that is, two memory blocks are grouped into one super block in all the memory chips 1210, 1230, 1250, 1270 and 1290 of the memory device 150. However, it is to be noted that different numbers of memory blocks may realize one super block in the memory chips 1210, 1230, 1250, 1270 and 1290 of the memory device 150, that is, the numbers of the memory blocks included in the super blocks of the respective memory chips 1210, 1230, 1250, 1270 and 1290 may be different.

A plurality of pages are included in each of the memory blocks included in the respective super blocks of the memory chips 1210, 1230, 1250, 1270 and 1290. Hereafter, it will be described as an example that the size of the plurality of pages included in the plurality of memory blocks (or planes), in other words, the size of data capable of being programmed/written in each of the plurality of pages (i.e., the chunk size) is 16 KB.

For example, the zeroth chip 1210 includes a fourth super block 1215 that includes two memory blocks, that is, an eighth plane 1217 and a ninth plane 1219 each including a plurality of pages. The size of the plurality of pages included in each of the planes 1217 and 1219 in the super block 1215 of the memory chip 1210, that is, a chunk size as the size of data capable of being programmed in each of the pages, is 16 KB.

Zeroth and first pages included in the planes 1217 and 1219 of the super block 1215 have already programmed other data before the data 6, the data 8, the data 3 and the data 10 are stored in the buffer 1200, and accordingly, a page capable of being programmed with data in the super block 1215, that is, a start page as a free page in the super block 1215 is a second page of the plane 1217. That is to say, programming data in the super block 1215 of the memory chip 1210 is performed from the second page of the plane 1217.

Programmable pages as free pages in the super block 1215 are second and third pages of the planes 1217 and 1219. In other words, programming data in the super block 1215 of the memory chip 1210 may be performed in the second and third pages of the planes 1217 and 1219. That is, one shot programming may be performed in the super block 1215 of the memory chip 1210. Accordingly, data having a size of 64 KB as a chunk size are programmable in free pages in the super block 1215, through one shot programming.

Therefore, free pages in the super block 1215 of the memory chip 1210 indicate that the second page of the plane 1217 is a program start page, and that the second and third pages of the planes 1217 and 1219 are programmable through one shot programming and thus data with a chunk size of 64 KB may be programmed. Namely, free pages in the super block 1215 of the memory chip 1210 indicate that one shot programming may be performed with a chunk size of 64 KB by taking the second page of the plane 1217 as a start page.

Also, the first chip 1230 includes a third super block 1235 that includes two memory blocks, that is, a sixth plane 1237 and a seventh plane 1239 each including a plurality of pages. The size of the plurality of pages included in each of the planes 1237 and 1239 in the super block 1235 of the memory chip 1230, that is, a chunk size as the size of data capable of being programmed in each of the pages, is 16 KB.

Zeroth pages included in the planes 1237 and 1239 of the super block 1235 have already programmed other data before the data 6, the data 8, the data 3 and the data 10 are stored in the buffer 1200, and accordingly, a page capable of being programmed with data in the super block 1235, that is, a start page as a free page in the super block 1235 is a first page of the plane 1237. That is to say, programming data in the super block 1235 of the memory chip 1230 is performed from the first page of the plane 1237.

Programmable pages as free pages in the super block 1235 are first pages of the planes 1237 and 1239. In other words, programming data in the super block 1235 of the memory chip 1230 may be performed in the first pages of the planes 1237 and 1239. That is, multi-plane programming may be performed in the super block 1235 of the memory chip 1230. Accordingly, data having a size of 32 KB as a chunk size are programmable in free pages in the super block 1235, through multi-plane programming.

Therefore, free pages in the super block 1235 of the memory chip 1230 indicate that the first page of the plane 1237 is a program start page, and that the first pages of the planes 1237 and 1239 are programmable through multi-plane programming and thus data with a chunk size of 32 KB may be programmed. Namely, free pages in the super block 1235 of the memory chip 1230 indicate that multi-plane programming may be performed with a chunk size of 32 KB by taking the first page of the plane 1237 as a start page.

Further, the second chip 1250 includes a second super block 1255 that includes two memory blocks, that is, a fourth plane 1257 and a fifth plane 1259 each including a plurality of pages. The size of the plurality of pages included in each of the planes 1257 and 1259 in the super block 1255 of the memory chip 1250, that is, a chunk size as the size of data capable of being programmed in each of the pages, is 16 KB.

A zeroth page included in the plane 1257 of the super block 1255 has already programmed other data before the data 6, the data 8, the data 3 and the data 10 are stored in the buffer 1200, and accordingly, a page capable of being programmed with data in the super block 1255, that is, a start page as a free page in the super block 1255 is a zeroth page of the plane 1259. That is to say, programming data in the super block 1255 of the memory chip 1250 is performed from the zeroth page of the plane 1259.

A programmable page as a free page in the super block 1255 is the zeroth page of the plane 1259. In other words, programming data in the super block 1255 of the memory chip 1250 may be performed in the zeroth page of the plane 1259. That is, one plane programming may be performed in the super block 1255 of the memory chip 1250. Accordingly, data having a size of 16 KB as a chunk size are programmable in a free page in the super block 1255, through one plane programming.

Therefore, a free page in the super block 1255 of the memory chip 1250 indicates that the zeroth page of the plane 1259 is, as a program start page, programmable through one plane programming and thus data with a chunk size of 16 KB may be programmed. Namely, a free page in the super block 1255 of the memory chip 1250 indicates that one plane programming may be performed with a chunk size of 16 KB by taking the zeroth page of the plane 1259 as a start page.

Furthermore, the third chip 1270 includes a first super block 1275 that includes two memory blocks, that is, a second plane 1277 and a third plane 1279 each including a plurality of pages. The size of the plurality of pages included in each of the planes 1277 and 1279 in the super block 1275 of the memory chip 1270, that is, a chunk size as the size of data capable of being programmed in each of the pages, is 16 KB.

A zeroth page included in the plane 1277 of the super block 1275 has already programmed other data before the data 6, the data 8, the data 3 and the data 10 are stored in the buffer 1200, and accordingly, a page capable of being programmed with data in the super block 1275, that is, a start page as a free page in the super block 1275 is a zeroth page of the plane 1279. That is to say, programming data in the super block 1275 of the memory chip 1270 is performed from the zeroth page of the plane 1279.

A programmable page as a free page in the super block 1275 is the zeroth page of the plane 1279. In other words, programming data in the super block 1275 of the memory chip 1270 may be performed in the zeroth page of the plane 1279. That is, one plane programming may be performed in the super block 1275 of the memory chip 1270. Accordingly, data having a size of 16 KB as a chunk size are programmable in a free page in the super block 1275, through one plane programming.

Therefore, a free page in the super block 1275 of the memory chip 1270 indicates that the zeroth page of the plane 1279 is, as a program start page, programmable through one plane programming and thus data with a chunk size of 16 KB may be programmed. Namely, a free page in the super block 1275 of the memory chip 1270 indicates that one plane programming may be performed with a chunk size of 16 KB by taking the zeroth page of the plane 1279 as a start page.

Moreover, the fourth chip 1290 includes a zeroth super block 1295 that includes two memory blocks, that is, a zeroth plane 1297 and a first plane 1299 each including a plurality of pages. The size of the plurality of pages included in each of the planes 1297 and 1299 in the super block 1295 of the memory chip 1290, that is, a chunk size as the size of data capable of being programmed in each of the pages, is 16 KB.

A start page as a free page in the super block 1295 is a zeroth page of the plane 1297. That is to say, programming data in the super block 1295 of the memory chip 1290 is performed from the zeroth page of the plane 1297.

Programmable pages as free pages in the super block 1295 are zeroth and first pages of the planes 1297 and 1299. In other words, programming data in the super block 1295 of the memory chip 1290 may be performed in the zeroth and first pages of the planes 1297 and 1299. That is, one shot programming may be performed in the super block 1295 of the memory chip 1290. Accordingly, data having a size of 64 KB as a chunk size are programmable in free pages in the super block 1295, through one shot programming.

Therefore, free pages in the super block 1295 of the memory chip 1290 indicate that the zeroth page of the plane 1297 is a program start page, and that the zeroth and first pages of the planes 1297 and 1299 are programmable through one shot programming and thus data with a chunk size of 64 KB may be programmed. Namely, free pages in the super block 1295 of the memory chip 1290 indicate that one shot programming may be performed with a chunk size of 64 KB by taking the zeroth page of the plane 1297 as a start page.

As described above, the controller 130 checks the chunk sizes of the data 6, the data 8, the data 3 and the data 10 stored in the buffer 1200. That is to say, the controller 130 checks that the chunk size of the data 6 is 64 KB, and the chunk size of the data 8 is 32 KB, and the chunk size of the data 3 is 16 KB and the chunk size of the data 10 is 8 KB.

In addition, in order to program and store the data 6, the data 8, the data 3 and the data 10 stored in the buffer 1200, in the memory device 150, the controller 130 checks the free pages of the super blocks 1215, 1235, 1255, 1275 and 1295 in the respective memory chips 1210, 1230, 1250, 1270 and 1290, as described above.

Namely, the controller 130 checks in the super block 1215 of the memory chip 1210 that one shot programming may be performed with a chunk size of 64 KB by taking the second page of the plane 1217 as a start page, and checks in the super block 1235 of the memory chip 1230 that multi-plane programming may be performed with a chunk size of 32 KB by taking the first page of the plane 1237 as a start page. Also, the controller 130 checks in the super block 1255 of the memory chip 1250 that one plane programming may be performed with a chunk size of 16 KB by taking the zeroth page of the plane 1259 as a start page, checks in the super block 1275 of the memory chip 1270 that one plane programming may be performed with a chunk size of 16 KB by taking the zeroth page of the plane 1279 as a start page, and checks in the super block 1295 of the memory chip 1290 that one shot programming may be performed with a chunk size of 64 KB by taking the zeroth page of the plane 1297 as a start page.

After checking the free pages of the super blocks 1215, 1235, 1255, 1275 and 1295 in the respective memory chips 1210, 1230, 1250, 1270 and 1290 as described above, the controller 130 determines that it is possible to program the data 6 with the size of 64 KB in the super block 1215 of the memory chip 1210 and the super block 1295 of the memory chip 1290, through one shot programming. According to the priority of a page address, the controller 130 programs the data 6 in the super block 1215 of the memory chip 1210. That is to say, the controller 130 programs the data 6 with the size of 64 KB in the second and third pages of the planes 1217 and 1219 in the super block 1215 of the memory chip 1210, through one shot programming.

In the case where the super block 1215 of the memory chip 1210 and the super block 1295 of the memory chip 1290 are not checked as super blocks capable of being programmed with the data 6 with the size of 64 KB through one shot programming, the controller 130 one-shot programs the data 6 in the super block of a memory chip which produces a minimum number of invalid pages after performing one shot programming of the data 6. For example, the controller 130 programs the data 6 with the size of 64 KB in second and third pages of the planes 1237 and 1239 in the super block 1235 of the memory chip 1230, through one shot programming.

After checking the free pages of the super blocks 1215, 1235, 1255, 1275 and 1295 in the respective memory chips 1210, 1230, 1250, 1270 and 1290 as described above, the controller 130 determines that it is possible to program the data 8 with the size of 32 KB in the super block 1235 of the memory chip 1230, through multi-plane programming. The controller 130 programs the data 8 in the super block 1235 of the memory chip 1230. That is to say, the controller 130 programs the data 8 with the size of 32 KB in the first pages of the planes 1237 and 1239 in the super block 1235 of the memory chip 1230, through multi-plane programming.

In the case where the super block 1235 of the memory chip 1230 is not checked as a super block capable of being programmed with the data 8 with the size of 32 KB through multi-plane programming, the controller 130 multi-plane programs the data 8 in the super block of a memory chip which produces a minimum number of invalid pages after performing multi-plane programming of the data 8. For example, the controller 130 programs the data 8 with the size of 32 KB in first pages of the planes 1257 and 1259 in the super block 1255 of the memory chip 1250 according to the priority of a page address, among the memory chips 1250 and 1270, through multi-plane programming.

After checking the free pages of the super blocks 1215, 1235, 1255, 1275 and 1295 in the respective memory chips 1210, 1230, 1250, 1270 and 1290 as described above, the controller 130 determines that it is possible to program the data 3 with the size of 16 KB in the super block 1255 of the memory chip 1250 and the super block 1275 of the memory chip 1270, through one plane programming. According to the priority of a page address, the controller 130 programs the data 3 in the super block 1255 of the memory chip 1250. That is to say, the controller 130 programs the data 3 with the size of 16 KB in the zeroth page of the plane 1259 in the super block 1255 of the memory chip 1250, through one plane programming.

In the case where the super block 1255 of the memory chip 1250 and the super block 1275 of the memory chip 1270 are not checked as super blocks capable of being programmed with the data 3 with the size of 16 KB through one plane programming, the controller 130 one-plane programs the data 3 in the super block of a memory chip which produces a minimum number of invalid pages after performing one plane programming of the data 3. For example, the controller 130 programs the data 3 with the size of 16 KB in the zeroth page of the plane 1297 in the super block 1295 of the memory chip 1290, through one plane programming.

After checking the free pages of the super blocks 1215, 1235, 1255, 1275 and 1295 in the respective memory chips 1210, 1230, 1250, 1270 and 1290 as described above, the controller 130 determines that it is possible to program the data 10 with the size of 8 KB in the super block 1255 of the memory chip 1250 and the super block 1275 of the memory chip 1270, through one plane programming. Since the data 3 are being programmed in the super block 1255 of the memory chip 1250, the controller 130 programs the data 10 in the super block 1275 of the memory chip 1270. That is to say, the controller 130 programs the data 10 with the size of 8 KB in the zeroth page of the plane 1279 in the super block 1275 of the memory chip 1270, through one plane programming. Because data with the size of 16 KB may be programmed in the zeroth page of the plane 1279 in the super block 1275 of the memory chip 1270, the controller 130 programs dummy data or null data in the remaining page region with the size of 8 KB after programming the data 10 with the size of 8 KB in the zeroth page of the plane 1279.

In the case where the super block 1255 of the memory chip 1250 and the super block 1275 of the memory chip 1270 are not checked as super blocks capable of being programmed with the data with the size of 8 KB through one plane programming, the controller 130 one-plane programs the data 10 in the super block of a memory chip which produces a minimum number of invalid pages after performing one plane programming of the data 10. For example, the controller 130 programs the data 10 with the size of 8 KB in the zeroth page of the plane 1297 in the super block 1295 of the memory chip 1290, through one plane programming.

As a consequence, in the memory system 110 in accordance with the embodiment, the size of write data corresponding to the write command received from the host 102 and the free pages of super blocks (i.e., groups of memory blocks) in the memory chips included in the memory device 150 and having the memory blocks, are checked. That is to say, the size of the write data and program/write start pages and the sizes of programmable/writable pages in the respective super blocks of the memory chips are checked. The write data are programmed/written in the super block of a corresponding memory chip. The write data may be programmed/written in the super block of a corresponding memory chip through one shot programming, multi-plane programming or one plane programming. Hereinbelow, operations of processing data in the memory system in accordance with the embodiment will be described in detail with reference to FIG. 13.

Figure 13:
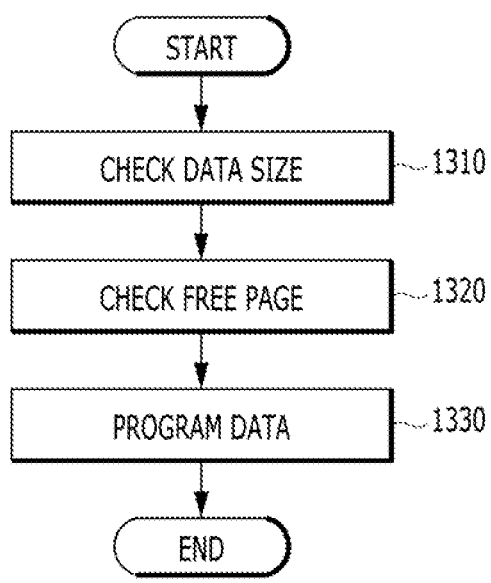
FIG. 13 is a schematic flow chart illustrating an operation process for processing data in the memory system in accordance with the embodiment.

FIG. 13 is a schematic flow chart illustrating an operation process for processing data in the memory system in accordance with the embodiment.

Referring to FIG. 13, at step 1310, the memory system checks the size of the write data requested from a host. In other words, if data corresponding to the write command received from the host are stored in a buffer/cache, the size, that is, the chunk size, of the data stored in the buffer/cache is checked.

At step 1320, in order to program and store the data stored in the buffer/cache, in a memory device, the free pages of super blocks (i.e., groups of memory blocks) are checked in memory chips included in the memory device 150 and having the memory blocks. Namely, program/write start pages and the sizes of programmable/writable pages in the super blocks of the memory chips are checked.

At step 1330, in consideration of the size of the data stored in the buffer/cache and the program/write start pages and the sizes of the programmable/writable pages in the memory blocks of the memory chips, the data stored in the buffer/cache are programmed/written in memory blocks of a corresponding memory chip through one shot programming, multi-plane programming or one plane programming.

Since data processing in the memory device 150, for example, the operation of programming/writing the data stored in the buffer/cache, in the memory chips included in the memory device 150 and having the plurality of memory blocks, in particular, through one shot programming, multi-plane programming or one plane programming, was described above in detail with reference to FIG. 12, detailed descriptions thereof will be omitted herein.

As is apparent from the above descriptions, the memory system and the operating method thereof according to the embodiments may maximize the efficiency of a memory device and may quickly and stably process data from the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device including a plurality of memory chips each including a plurality of memory blocks grouped as one or more super blocks, wherein the memory blocks each include a plurality of pages suitable for storing write data requested from a host; and
a controller suitable for checking a size of the write data and free pages of the super blocks, determining a first super block corresponding to the checked size of the write data based on the checked free pages among the super blocks, and programming the write data in memory blocks of the first super block,
wherein the respective super blocks have a same size,
wherein, when the size of the write data is a first size, the controller programs the write data in a first page group of the first super block, by starting from a program start page of the first page group, through one shot programming,
wherein, when the size of the write data is a second size, the controller programs the write data in a second page group of the first super block, by starting from a program start page of the second page group, through multi-plane programming,
wherein, when the size of the write data is a third size, the controller programs the write data in a third page group of the first super block, by starting from a program start page of the third page group, through one plane programming,
wherein, the first page group includes first pages included each in all of memory blocks of the first super block,
wherein, the number of the first pages are determined according to the first size,
wherein, the second page group includes second pages included each in some of memory blocks of the first super block,
wherein, the number of the second pages are determined according to the second size,
wherein, the third page group includes third pages included in one memory block of the first super block,
wherein, the number of the third pages are determined according to the third size.

2. The memory system according to claim 1, wherein the controller checks program start pages and programmable pages in the respective super blocks included in the memory chips, as the free pages.

3. The memory system according to claim 2, wherein the first size is greater than a total size of respective pages of the memory blocks of the first super block, and the programmable page includes one or more pages of each of the memory blocks of the first super block.

4. The memory system according to claim 2, wherein the second size is greater than a size of one page of the memory blocks of the first super block, and the programmable page includes pages of two or more memory blocks of the first super block.

5. The memory system according to claim 2, wherein the third size is equal to a size of one page of the memory blocks of the first super block, and the programmable page includes a page of one memory block of the first super block.

6. The memory system according to claim 2,
wherein the third size is smaller than a size of one page of the memory blocks of the first super block, and
wherein the controller programs dummy data or null data in a remaining page region of the programmable page, after programming the write data.

7. The memory system according to claim 1, wherein, when two or more super blocks are checked as the first super block among the super blocks, the controller determines one of the two or more super blocks as the first super block based on a priority of a page address.

8. The memory system according to claim 1, wherein, when two or more super blocks are checked as the first super block among the super blocks, the controller determines one of the two or more super blocks as the first super block based on program performance.

9. A method for operating a memory system, comprising:
checking a size of write data corresponding to a write command received from a host, and checking free pages of a plurality of super blocks, wherein a plurality of memory blocks of a memory device are grouped as the super blocks and each include a plurality of pages;

determining a first super block corresponding to the checked size of the write data based on the checked free pages among the super blocks; and programming the write data in memory blocks of the first super block, wherein, the respective super blocks have a same size, wherein, when the size of the write data is a first size, the programming of the write data includes:

programming the write data in a first page group of the first super block, by starting from a program start page of the first page group, through one shot programming, wherein, when the size of the write data is a second size, the programming of the write data includes:

programming the write data in a second page group of the first super block, by starting from a program start page of the second page group, through multi-plane programming, wherein, when the size of the write data is a third size, the programming of the write data includes:

programming the write data in a third page group of the first super block, by starting from a program start page of the third page group, through one plane programming, wherein, the first page group includes first pages included each in all of memory blocks of the first super block, wherein, the number of the first pages are determined according to the first size, wherein, the second page group includes second pages included each in some of memory blocks of the first super block, wherein, the number of the second pages are determined according to the second size, wherein, the third page group includes third pages included in one memory block of the first super block, wherein, the number of the third pages are determined according to the third size.

10. The method according to claim 9, wherein the checking of the free pages includes:

checking program start pages and programmable pages in the respective super blocks.

11. The method according to claim 10, wherein the first size is greater than a total size of respective pages of the memory blocks of the first super block, and the programmable page includes one or more pages of each of the memory blocks of the first super block.

12. The method according to claim 10, wherein the second size is greater than a size of one page of the memory blocks of the first super block, and the programmable page includes pages of two or more memory blocks of the first super block.

13. The method according to claim 10, wherein the third size is equal to a size of one page of the memory blocks of the first super block, and the programmable page includes a page of one memory block of the first super block.

14. The method according to claim 10, wherein the third size is smaller than a size of one page of the memory blocks of the first super block, and wherein the programming of the write data further includes:

programming dummy data or null data in a remaining page region of the programmable page.

* * * * *